United States Patent

[11] 3,559,679

| [72] | Inventor | Johannes R. Smirra<br>Starnberg, Germany |
|---|---|---|
| [21] | Appl. No. | 779,140 |
| [22] | Filed | Nov. 26, 1968 |
| [45] | Patented | Feb. 2, 1971 |
| [73] | Assignee | TRW Inc.<br>Redondo Beach, Calif.<br>a corporation of Ohio |

[54] HINGE VALVE
3 Claims, 4 Drawing Figs.

[52] U.S. Cl. ..................................... 137/554,
137/512.1, 137/521, 137/601; 251/65, 251/228
[51] Int. Cl. ........................................ F16k 31/163,
F16k 1/16
[50] Field of Search ........................... 137/601,
512.1, 521, 554; 251/228, 65; 98/41

[56] References Cited
UNITED STATES PATENTS

| 3,020,821 | 2/1962 | Garrison | 98/41 |
|---|---|---|---|
| 2,956,582 | 10/1960 | Pranter | 251/228X |
| 3,053,275 | 9/1962 | Waterfill | 137/521X |
| 3,074,427 | 1/1963 | Wheeler, Jr. | 137/512.1 |
| 3,116,016 | 12/1963 | Joesting | 137/521X |
| 3,294,115 | 12/1966 | Koenigsberg et al. | 251/65X |
| 3,384,112 | 5/1968 | Smith | 137/512.1 |
| 3,439,706 | 4/1969 | Barrett | 137/554 |

*Primary Examiner*—Robert G. Nilson
*Attorneys*—Daniel T. Anderson, Gerald Singer and Alfons Valukonis

ABSTRACT: A hinge valve is described which controls fluid flow by means of movable flap sections which are actuated by fluid pressure on associated linkage so as to move from a closed position to an opened position - or vice versa.

PATENTED FEB 2 1971

Johannes R. Smirra
INVENTOR.

BY Donald W. Graves

ATTORNEY

Johannes R. Smirra
INVENTOR.

HINGE VALVE

BACKGROUND OF THE INVENTION

The field to which this invention is directed is in the area of valves for controlling the flow of fluids.

Prior art devices to control the flow of fluid fall in several categories. One such category is gate valves. These valves have the advantage of providing low-pressure drops but suffer the disadvantage of having high inertia. In addition, high actuation forces are necessary and a large envelope must be provided to accommodate the moving element.

Ball valves involve a high mass rotating part which inherently limits the response time because of inertia.

Poppet valves are capable of rapid response due to their large obstruction the flow causes a relatively large pressure drop.

Check valves provide a minimum area in the flow path when in the opened position, are fast operating due to low inertia, and in addition do not require a large envelope to contain the moving part, or parts. However, it is difficult to actuate a check valve to provide flow control. Examples of a type of check valve are shown in Mission Duo-Chek Check Valve Catalog No. 4 and manufactured by the Mission Valve and Pump Company, a subsidiary of Mission Manufacturing Company, recently merged into TRW Inc. This type of valve pivots about the center of the conduit from a closed position with the semicircular flaps nestled together. When actuated by a surge of downstream pressure the valve flaps will rotate to a closed position to shut off the flow. There is, however, no way of actuating the flaps to cause the check valve to function as a flow control valve.

SUMMARY OF THE INVENTION

This invention is directed to a hinged dual flap valve which is actuated by fluid pressure and a mechanical linkage to move the vale from a closed or opened position to an opened of closed position, respectively, or any position there between, whereby to have a self-contained, low inertia and low-pressure drop flow control valve.

DESCRIPTION OF THE PREFERRED EMBODIMENT

Figure 1:
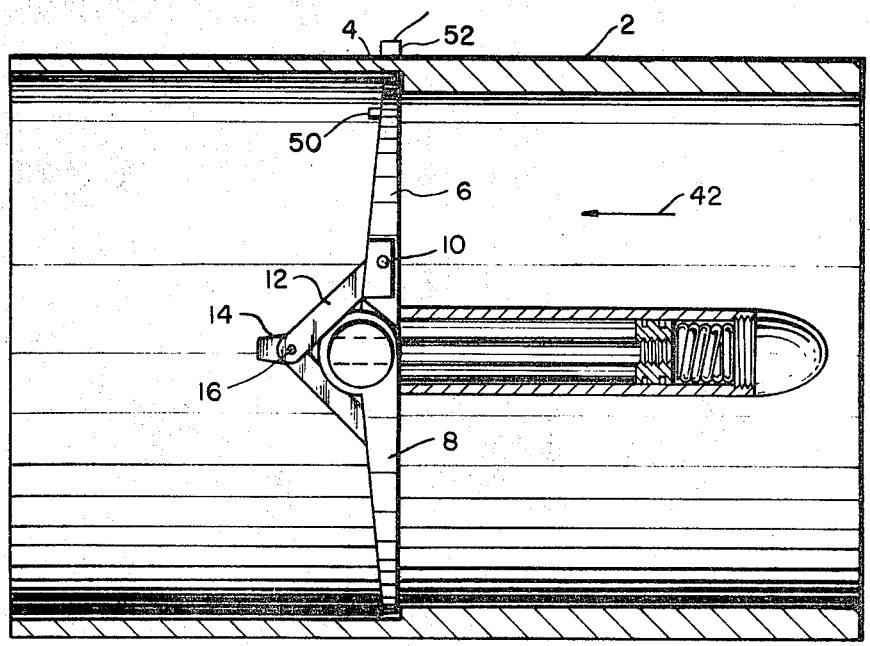
FIG. 1 is a view partially in cross section of the controlled hinge valve as located in a conduit in closed position.

Shown in FIG. 1 is a length of a conduit 2 having a ledge or abutment 4 against which rest semicircular flaps 6 and 8 when the valve is in closed position. Flap 6 is connected by means of pin 10 to linkage 12 which is in turn connected to longitudinal shaft 14 by means of pin 16.

Shaft 14 (see FIG. 2) passes through support 18 by means of aperture 20. Shaft 18 is connected to conduit 2 by passing through apertures therein and then sealed by means of caps 22 and 24.

Flap 6 has a portion broken away to illustrate the linkage between flap 6 and shaft 14. Thus, it can be seen the pin 16 extends through shaft 14 and one end of link 12. Link 12, in turn, has a pin 10 extending through one end of linkage 12 and a portion of flap 6. Cutaway portion 26 (see also FIG. 3) is provided to have access at pin 10 for means of assembly or disassembly. Flap 6 has a portion 28 which encircles shaft 18 to allow rotation of flap 6 about shaft 18.

Figure 2:
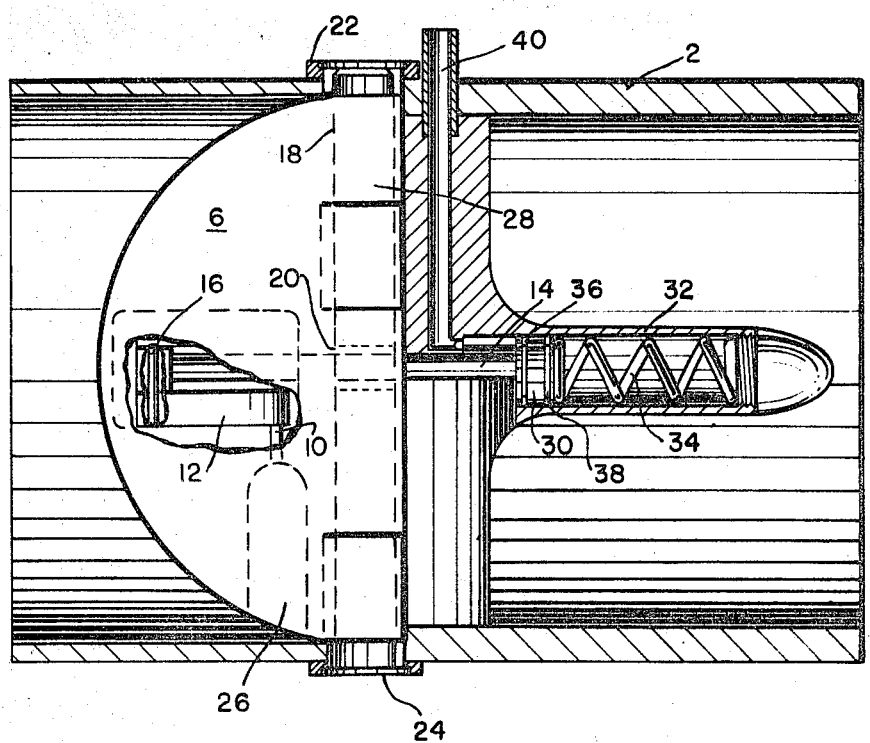
FIG. 2 is a view partially in cross section of the valve in opened position.

The other end of shaft 14 is attached to piston 30 which rides in cylinder 32. A spring 34 biases piston 30 to the left as shown in FIG. 2. Seals 36 and 38 are provided to prevent leakage of fluid past piston 30 into cylinder 32.

Fluid line 40 which is parallel to shaft 18 and which could be located therein, if desired, allows fluid pressure to be exerted against the left-hand side of piston 30. When fluid pressure is admitted into line 40, the pressure against piston 30 will overcome the bias of spring 34, and therefore move to the right. This will activate the linkage to move flap 6 from an opened position (FIG. 2) to a closed position as shown in FIG. 1. The fluid flow is shown in the direction of arrow 42 of FIG. 1. When it is desired to open the valve, the fluid pressure in line 40 is released or the fluid vented and spring 34 will move flaps 6 and 8 to a closed position. If fluid pressure in conduit 2 is exerted against flaps 6 and 8, the closing response time will be even more rapid.

Figure 3:
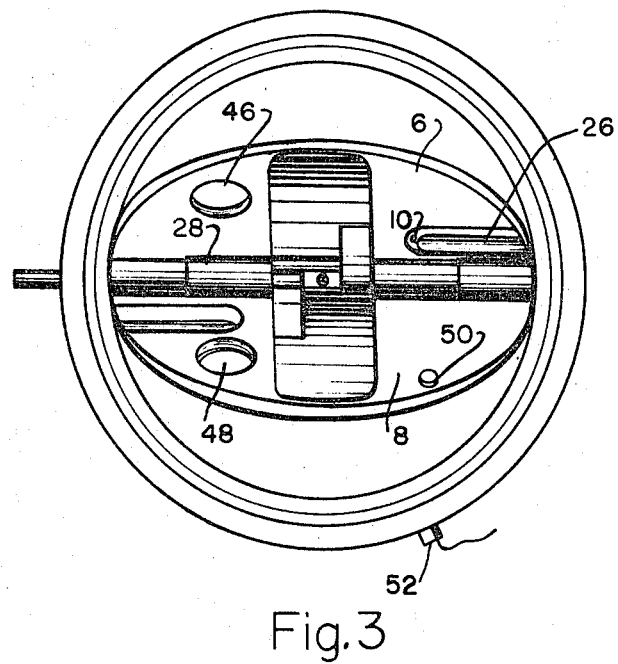
FIG. 3 is a view of the valve in partial opened position from the downstream side of the valve.

FIG. 3 shows flaps 6 and 8 in an intermediate position as viewed looking toward the upstream direction.

Referring to FIG. 3, cavities 46 and 48 are shown in flaps 6 and 8, respectively. These cavities are for the purpose of holding a magnet in the interface of each flap so that when the valve is in the opened position they will be secured together to prevent Chatter. A second small magnet 50 may be embedded in one of the flaps for the purpose of actuating a proximity switch 52 mounted on the exterior of the valve so as to indicate the valve's position.

Figure 4:
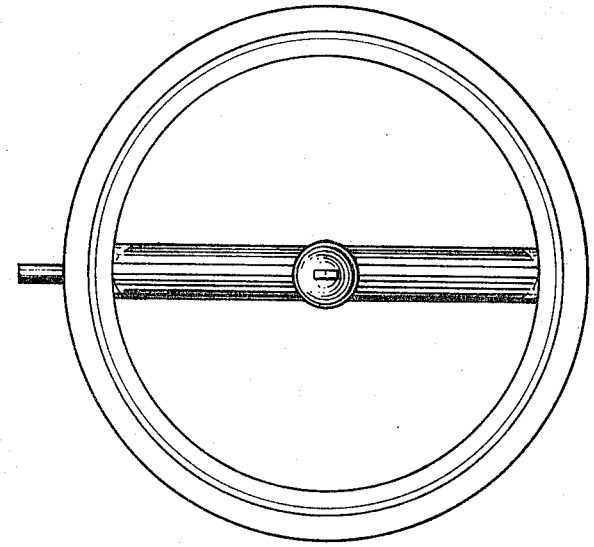
FIG. 4 is a view of the valve in closed position from the upstream side of the valve.

FIG. 4 is illustrative of one of the major advantages of this valve and that is the relatively small cross-sectional area that the valve has when in closed position.

Thus, it can be seen that this invention obviates many of the disadvantages of other valves while combining the advantages. The valve has a fast response time due to its low inertia. There is no need for a large envelope to accommodate the valve parts as it is self-contained. This has the additional advantages of preventing leakage to the exterior of the conduit. Also, due to the small cross section area in the opened position, the pressure drop is minimal.

It is obvious to those skilled in the art that the valve can be operated in the reverse mode. That is, the fluid actuator can be utilized to close the valve such as would be the case if the flow in the conduit were opposite to that shown in FIG. 1.

Also, while the invention has been described as using a fluid actuator, it is apparent that other actuating devices could be used such as an external mechanical linkage.

Having described this invention it is to be understood that it is limited only by the scope of the claims appended hereto.

I claim:

1. A flow control valve for controlling the flow of fluid in a conduit, that improvement which comprises:

a support member in said conduit, said support member extending substantially diametrically across the interior of said conduit, at least two-flap members pivotally attached to said support member, said flap members being adapted to move from an open position to allow flow of fluid through said conduit to a closed position to prevent flow of fluid, said flap members when in an open position presenting substantially the same cross-sectional area as said support member to said fluid flow; and actuating means adapted to move said flap members from one of said positions to the other of said positions and to positions intermediate thereof, said actuating means being located in said support member whereby fluid flow through said conduit is unobstructed by said actuating means, said at actuating means comprising linkage connected to said flap members and further comprising a piston pivotally attached to said linkage, and means to exert fluid pressure against said piston whereby to actuate said linkage and said flap members from one of said positions to the other of said position.

2. A flow control valve according to claim 1 wherein said flap members include magnet means associated with said flap members whereby to prevent chattering of said flap members during fluid flow.

3. A flow control valve according to claim 1 and further including means on at least one of said flap members adapted to actuate a proximity switch and further including a proximity switch associated with said conduit whereby to indicate the position of said flap members.